United States Patent [19]
Lau

[11] Patent Number: 5,987,247
[45] Date of Patent: *Nov. 16, 1999

[54] SYSTEMS, METHODS AND COMPUTER PROGRAM PRODUCTS FOR BUILDING FRAMEWORKS IN AN OBJECT ORIENTED ENVIRONMENT

[75] Inventor: Christina Lau, Ontario, Canada

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/853,207

[22] Filed: May 9, 1997

[51] Int. Cl.$^6$ ........................................... G06F 9/45
[52] U.S. Cl. ........................ 395/702; 395/705; 395/704
[58] Field of Search ..................... 395/702, 701, 395/705, 708, 703, 709; 345/344, 433; 364/704, 601

[56] References Cited

U.S. PATENT DOCUMENTS

| | | | |
|---|---|---|---|
| 4,734,854 | 5/1988 | Afshar | 395/703 |
| 5,481,718 | 1/1996 | Ryu et al. | 395/701 |
| 5,499,371 | 3/1996 | Henninger et al. | 395/700 |
| 5,524,246 | 6/1996 | Hurley et al. | 713/1 |
| 5,560,012 | 9/1996 | Ryu et al. | 395/701 |
| 5,644,764 | 7/1997 | Johnson et al. | 395/614 |
| 5,668,998 | 8/1997 | Mason et al. | 395/701 |
| 5,706,505 | 1/1998 | Fraley et al. | 395/614 |
| 5,715,460 | 2/1998 | Acker et al. | 395/705 |
| 5,721,925 | 2/1998 | Cheng et al. | 395/683 |
| 5,737,559 | 4/1998 | Orton et al. | 345/344 |
| 5,758,160 | 5/1998 | McInerney et al. | 395/701 |
| 5,768,510 | 6/1998 | Gish | 709/203 |
| 5,848,273 | 12/1998 | Fontana et al. | 395/701 |
| 5,872,973 | 2/1999 | Mitchell et al. | 395/702 |

FOREIGN PATENT DOCUMENTS

| | | | |
|---|---|---|---|
| 0817035A2 | 1/1998 | France | G06F 9/46 |

OTHER PUBLICATIONS

Abstract, *The benefits of building object–oriented applications, Softw. Econ. Lett.*, vol. 5, No. 8, Computer Economics, pp. 103 (Aug. 1996).

Abstract, Castellano, G.V., et al., *System Object Model (SOM) and Ada: an example of CORBA at work, Ada Lett.*, vol. 16, No. 3, ACM, pp. 39–51 (May–Jun. 1996).

Abstract, Blakeley, J.A., *Open object database management systems, 1994 ACM SIGMOD International Conference on Management of Data, Minneapolis, Minnesota*, vol. 23, No. 2, p. 520 (Jun. 1994).

(List continued on next page.)

*Primary Examiner*—Tariq R. Hafiz
*Assistant Examiner*—Anil Khatri
*Attorney, Agent, or Firm*—Myers Bigel Sibley & Sajovec; Edward H. Duffield

[57] ABSTRACT

Systems, methods and computer program products enable framework building by interactively generating a framework corresponding to a design and editing the interactively generated framework to obtain a completed framework. The framework is displayed in various stages of construction or modification using a number of different views including a tree view, a graph view, a method view and an edit view. In addition, parts of the framework are identified as requiring completion, as completed, and as permitting completion. Still further, user methods and framework methods are differentiated. Help guided actions are provided and may be invoked to assist in the development process. Once the framework has been completed, it can be stored in a data model, and code can be generated from the completed framework. Finally, interfaces developed using conventional editors may be parsed and imported into the data model for later code generation. As a result of the present invention, code may be generated based on the completed framework and executed in a distributed computing environment.

76 Claims, 4 Drawing Sheets

OTHER PUBLICATIONS

Abstract, Short, K., *Developing with business object, Object Mag.,* vol. 5, No. 1, pp. 66, 68–72 (Mar.–Apr. 1995).

Abstract, Adamczyk, Jr. et al., *Trading off; inheritance vs. reuse, Object Mag.,* vol. 5, No. 5, pp. 56–59 (Sep. 1995).

Abstract, *How Xerox is coupling object–oriented analysis with business process reegineering, I/S Anal.,* vol. 34, No. 8, pp. 11–15 (Aug. 1995).

Abstract, *Object oriented business engineering: delivering the Distributed Enterprise, IN Object Expo. Conference Proceedings, Proceedings of OBJECT EXPO '94,* pp. 257–263 (Jun. 6–10, 1994).

*http://www.objectquest.com/modules.htm#UIbuilder; ObjectQuest™,* pp. 1–10.

*http://www.persistance.com/persistance/pageThree.pages/pr.patent.html; Persistance Software Awarded Technology Patent,* pp. 1–2.

*http://www.persistance.com/persistance/pageTwo.pages/otoroview.html; Delivering The Benefits of Objects In A Relational World,* pp. 1–11.

*http://www.janiff.com/docs/busfun.htm; APOL 'Business' Functionality,* pp. 1–3.

*http://www.cherigov.ua/~softfab/sf ua3.html; Background to OpenDoc,* pp. 1–6.

*http://www.omg.org, What is CORBA????,* pp. 1–2.

*http://www.rational.com;* total pages:52.

Balen, Henry., "CORBA and the WWW", OOPLSLA ACM SIGPLAN, conf. OO prog. syst. lang & appl. pp. 128–132, 1997.

Sutherlan, Jeff, "Business object design and implemenation III", OOPSLA ACMSIGPLAN, conf. 00 prog. sys. lang. & appl., pp. 58–62, 1997.

Hansen, Todd., "Development of successful object oriented framework", OOPSLA ACM SIGPLAN, conf. prog. sys. lang. & appl. pp. 115–119, 1997.

Orfali et al. The essential distributed objects survival guide, John Wiely, Ny (pp. 239–260), 1996.

Object–oriented Design Archaeology with CIA ++, Computing Systems, vol. 5, No. 1, pp. 5–62, Winter 1992.

Serge Du & Christian Arnault, Experience with object–oriented methodolegies in the new online event display for Delphi, pp. 873–876, France, Sep. 1992.

Tate, A., Entering the third dimension(Framework software package), Office Equipment News, pp. 34, UK, Jul. 1984.

Sridhar Iyengar, Distributed object Repositories:Concepts and Standards, Conceptual Modeling–ER'97, 16th International Conference, pp. 85–101, Nov. 1997.

```
USER-DEFINED INTERFACES
    -CUSTOMER
        -CUSTOMERBO
            -CUSTOMERDO
                -CUSTOMERUNITTESTDO
                -CUSTOMERRELATIONALDO
            -CUSTOMERMO
        -CUSTOMERKEY1
        -CUSTOMERKEY2
        -CUSTOMERCOPY1
        -CUSTOMERCOPY2
        -CUSTOMERHOME
```

SYSTEMS, METHODS AND COMPUTER PROGRAM PRODUCTS FOR BUILDING FRAMEWORKS IN AN OBJECT ORIENTED ENVIRONMENT

This invention relates to data processing systems, methods and computer program products, and more particularly, to object oriented development systems, methods and computer program products.

BACKGROUND OF THE INVENTION

Overview: Object Oriented Technology

Object oriented programming systems and processes, also referred to as "object oriented computing environments," have been the subject of much investigation and interest in state of the art data processing environments. The present invention was developed using object oriented framework technology.

Object Oriented Technology v. Procedural Technology

Although the present invention relates to a particular object oriented technology (i.e., object oriented framework technology), the reader must first understand that, in general, object oriented technology is significantly different than conventional, process-based technology (often called "procedural" technology). While both technologies can be used to solve the same problem, the ultimate solutions to the problem may be quite different. This difference is due to the fact that the design focus of procedural technology is entirely different from that of object oriented technology. The focus of process-based design is on the overall process that solves the problem; whereas, the focus of object oriented design is on how the problem can be broken down into a set of autonomous entities that can work together to provide a solution.

Object Oriented Technology Terminology

The autonomous entities of object oriented technology are called objects. Said another way, object oriented technology is significantly different from procedural technology because problems are broken down into sets of cooperating objects instead of into hierarchies of nested computer programs or procedures. An object is a data structure, also referred to as a "frame," and a set of operations or functions, also referred as "methods," that can access that data structure. The frame has many "slots" each of which contains an "attribute" of the data in the slot. The attribute may be a primitive such as an integer or a string or an object reference which is a pointer to another object. Objects having similar characteristics and common behavior can be grouped together into, and collectively identified as, a "class."

Each defined object will usually be manifested in a number of "instances." Each instance contains the particular data structure for a particular example of the object. In an object oriented computing environment, the data is processed by requesting an object to perform one of its methods by sending the object a "message." The receiving object responds to the message by choosing the method that implements the message name, executing this method on the named instance and returning control to the calling high-level routine along with the results of the method. The relationships between classes, objects and instances are established during "build time" or generation of the object oriented computing environment, i.e., prior to "run time" or execution of the object oriented computing environment.

In addition to the relationships between classes, objects and instances identified above, hierarchical relationships also exist between two or more classes such that a first class may be considered a "parent" of a second class and the second class may be considered a "child" of the first class. In other words, the first class is an ancestor of the second class and the second class is a descendant of the first class, such that the second class (i.e, the descendant) is said to inherent from the first class (i.e., the ancestor).

Frameworks

The word "framework" has multiple meanings in object oriented technology. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an object oriented mechanism that has been designed to have core function and extensible function. The core function is the part of the framework mechanism that is not subject to modification by the framework user. The extensible function, on the other hand, is that part of the framework mechanism that has been explicitly designed to be customized and extended by the framework user.

A framework may be generally defined as a set of cooperating classes that make up a reusable design for a specific class of software. A framework may be directed to, for example, building graphical editors for different domains such as artistic drawings, music compositions, mechanical computer aided designs, a compiler for a programming language, target machines or a financial modeling application. A framework is customized to a particular application by creating application specific subclasses of abstract classes from the framework. The framework defines the overall structure, its partitioning into classes and objects, the key responsibilities of the classes and objects, the relationships between the classes and objects, and the control of the application. The framework also captures the design decisions that are common to its application domain.

In essence, a framework is comprised of a set of related classes that are designed to interact to solve a particular problem. The framework provides the specific connections and relationships between the relating classes and internally manages the flow of control.

Object Oriented Framework Mechanisms

While in general terms an object oriented framework mechanism can be properly characterized as an object oriented solution, there is nevertheless a fundamental difference between a framework mechanism and a basic object oriented solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to users (referred to herein as framework consumers) because the cost of customizing or extending a framework is much less than the cost of replacing or reworking an existing solution.

Therefore, when framework designers set out to solve a particular problem, they do more than merely design individual objects and how those object interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

ZAF—An Illustrative Framework Mechanism

While those skilled in the art appreciate that framework design is necessarily an intertwined and iterative process, example design choices for a simplistic framework mechanism are set forth in the paragraphs that follow. It should be understood, though, that this is only an example framework that is being used in this specification to illustrate and best explain framework mechanisms such that the reader can understand and appreciate the benefits and advantages of the present invention.

Framework designers determine what objects are needed for a framework mechanism by selecting objects from what is called the "problem domain." The problem domain is an abstract view of the specific problem at hand. The example problem domain chosen for this illustrative framework mechanism is that of zoo administration. The specific problem is that of designing a mechanism that assists zoo keepers in the care and feeding of zoo animals. In our example of a Zoo Administration Framework (ZAF), an object oriented framework designer would look to the zoological problem domain and decide that any ZAF would of necessity involve a mechanism that represented the relationship between zoo keepers and animals (i.e., to represent how zoo keepers care for animals). The framework designer would also likely recognize that zoo animals usually live in cages, pens, tanks, and other sorts of containment units. Therefore, our framework designer would start with the idea that the framework would have to involve mechanisms that represented all of these fundamental entities and relationships.

Object Oriented Computing Environment

Referring now to FIG. 1, a schematic block diagram of an object oriented computing environment 10 is illustrated. The object oriented computing environment 10 includes a processor 11 which may be a mainframe computer, minicomputer, personal computer, or other hardware platform. As is well-known to those having skill in the art, processor 11 includes a volatile data storage device 13, typically random access memory (RAM), for providing a working storage for active data and intermediate results. Data in RAM 13 is erased when power to the data processor 11 is removed or a new user session is begun.

Object oriented computing environment 10 also includes a non-volatile data storage device 14 for permanent storage of objects. Device 14 may be a direct access storage device (DASD), a disk file, a tape file, or erasable optical disk or other well-known device. A display terminal 15 including a cathode ray tube (CRT) or other display, a keyboard and a mouse, is also shown.

An object oriented program 12 runs or executes in processor 11. Object oriented operating program 12 may be programmed in object oriented languages such as "C++" or "SmallTalk" or variations thereof, or in conventional programming languages such as FORTRAN or COBOL. The design of an object oriented operating program 12 is well-known to those skilled in the art of object oriented computing environments, and will not be described herein. A detailed description of the design and operation of an object oriented program is provided in "Object Oriented Software Construction," by Bertrand Meyer, published by Prentice Hall in 1988, the disclosure of which is incorporated herein by reference.

Development Tools

Development tools exist for developing object oriented programming applications. These tools are used to develop designs for, or build core portions of, the applications. Typically, a development tool comprises a user interface that collects a certain amount of input from the developer for which the tool creates some "skeleton" code. The input provided by the developer may be referred to as "metadata." More generally, metadata is self-descriptive information that can describe both services and information. Typically, the generated "skeleton code" does not make up the entire application. As a result, the developer must extend the generated "skeleton code" by using a source editor to complete the code development. An example of such an extension is business logic that computes the salary of an employee. Having prepared the code extensions, the developer will build, or compile and link, the application using a traditional compiler.

As the users of computer applications continue to grow in size and continue to increase their reliance on computer applications, these users and, in particular, large enterprise users, are migrating to a three tier architecture for mission critical applications. Developers of these mission critical applications, and in particular, developers of applications implemented using distributed object oriented technology, require sophisticated application development tools. The application development tools required by these developers ideally provide a broad range of functions including business modeling, object oriented analysis, business object development, business object composition, automatic generation of wrappers for existing legacy data, distributed debugging, and generation of tracing and performance data.

A three tier client/server distributed application operates in an environment in which the first tier is the client side of the application, the second tier or middle object is the server side of the application, and the third tier is the "back end" of the application. An example of the client side is a browser. The business logic resides on the server. The server, for example, may be an NT Workstation marketed by International Business Machines Corporation ("IBM"), the assignee of the present invention. The "back end" may be an MVS system, also marketed by IBM. The legacy data resides in the "back end." Legacy data refers to existing data or user data.

One problem with the existing development tools is that they may not adequately address business object development and business object composition during the development of an application. Examples of issues that face a developer during business object development include the need to determine how a business object accesses data stored in the "back end." By way of further example, the developer typically must also determine and identify how one business object calls other business objects in a distributive fashion, and how a particular business object participates in the business transaction. Still further, the developer typically must address business object composition. In other words, once a business object has been developed, a developer typically must specify how the business object can be used to build other business objects.

Unless a developer properly addresses the business object development and business object composition issues for purposes of running the developed business objects in a distributive environment, customers may not be able to migrate to a three tier architecture for mission critical applications in a cost-effective manner. Otherwise, the development of the three tier architecture for mission critical applications for use in a distributed environment may be extremely costly.

SUMMARY OF THE INVENTION

It is, therefore, an object of the present invention to provide systems, methods and computer program products that enable the effective development of three tier architectures for applications which will run in a distributed environment.

It is another object of the present invention to provide systems, methods and computer program products for assisting a developer in object development and object composition for use in a three tier architecture for mission critical applications.

It is still a further object of the present invention to provide systems, methods and computer program products which can be used to develop objects and manage the developed objects which will run in a distributive environment.

These and other objects are provided according to the present invention by systems, methods and computer program products for building a framework of objects corresponding to a design for an object oriented application. The system enables interactive generation of an initial framework that corresponds to a design and editing of the initial framework, to complete the framework for the object oriented application. The framework comprises one or more of file objects, module objects, interface objects, methods and attributes.

The invention is described with respect to specific objects and designs, and a specific business object programming environment; however, the invention is not restricted to any particular objects or designs, or object programming environment. Rather, the invention may be applicable to any object oriented programming environment.

The framework is completely built by first generating an initial framework. The generated initial framework is then displayed on a display means. Changes to the initial framework are accepted, and the accepted changes are implemented to obtain a completed framework.

During the building of the completed framework, a differentiation is made between user methods and framework methods in the initial framework. In addition, the first part of the initial framework is identified as requiring completion, a second part of the initial framework is identified as being complete, and a third part of the initial framework is identified as permitting, but not requiring, completion. The identified first part and the identified third part are displayed. The identified second part is not displayed.

Still further, the displaying means comprises a means for displaying a tree view of the generated initial framework, the tree view comprising at least one file object, and means for displaying a graph view of the object in the generated initial framework, the graph view representing relationships between objects in the generated initial framework. In addition, the display means for displaying the generated initial framework also comprises means for displaying a method view of the method corresponding to the object in the generated initial framework, and means for displaying the accepted changes to the first part of the initial framework.

The system for building a framework of objects according to the present invention also comprises means for storing the completed framework, means for generating computer program code corresponding to the completed framework, means for parsing interface definitions of the initial framework, and means for importing the parsed interface definitions into the storing means.

Still further, the present invention also provides a number of actions for modifying the tree view. In an alternative embodiment, the generating means comprises means for displaying options for acting on components of the framework and for accepting selection of the options to be included in the generated initial framework, means for generating the framework from the selected options and the design, and means for storing the generated initial framework.

In addition, the design according to the present invention may be a business logic design. The present invention also accepts an initial business logic design, generates a business logic design corresponding to the initial business logic design, and imports the business logic design to the initial framework generator. Moreover, the completed framework built according to the present invention may be executed in a distributed computing environment. Finally, the system according to the present invention enables building at least one of a CORBA™ (International Business Machines, Inc.) framework and a JAVA™ (Sun Microsystems, Inc.) framework.

The present invention may also provide a computer program product for building a framework of objects corresponding to a design for an object oriented application. Such a computer program product may include a computer readable storage medium having computer readable code means embodied in the medium. The computer readable code means may then include computer instruction means for generating an initial framework corresponding to the design. The initial framework corresponds to at least one of file objects, module objects, interface objects, methods and attributes. Computer instructions means are also provided for displaying the generated initial framework and for accepting changes to a first part of the initial framework. Computer instruction means for implementing the accepted changes to the first part of the initial framework to obtain a completed framework are also provided. In particular the computer instruction means for generating a framework preferably includes computer Instruction means for displaying options for types of run-time objects and for selecting selection of at least one of said options for types of run-time objects to be Included in the completed framework as well as computer instruction means for generating run-time objects from said selected options and a business logic design and computer instruction means for storing the run-time objects.

DESCRIPTION OF THE PREFERRED EMBODIMENTS

The present invention will now be described more fully hereinafter with reference to the accompanying drawings, in which a preferred embodiment of the present invention is shown. This invention may, however, be embodied in many different forms and should not be construed as limited to the embodiments set forth herein; rather, this embodiment is provided so that this disclosure will be thorough and complete, and will fully convey the scope of the invention to those skilled in the art. Like numbers refer to like elements throughout.

Overview: Framework Builder And Object Types

The system for building frameworks according to the present invention enforces a consistent programming model for application developers. It reduces the learning curve for developers by generating all necessary "plumbing" code, the correct interface definition language (IDL) and JAVA syntax, and the correct framework calls which are necessary for transaction, locking and concurrency in distributed object oriented applications. JAVA syntax refers to the syntax of the JAVA software, which is marketed by Sun Microsystems. As a result of the present invention, the programmer may focus on the design by separating out the "plumbing" code that is needed to enable operation in a distributed environment into the "implementation binding" file and concentrating only on the contents of the "implementation template" file.

The framework building system according to the present invention supports development of several types of objects, including, Business Objects, Data Objects and Application Objects. In addition, there are two types of Business Objects, namely, a "Basic" Business Objects and a "Composed" Business Objects. A Basic Business Object refers to an object that encapsulates business logic data or information, while a Composed Business Object refers to a Business Object that is built from multiple Basic Business Objects. A Data Object is responsible for managing the persistence of the state data in a Business Object. Finally, an Application Object implements the transient and persistent state of actively executing applications.

Figure 2:
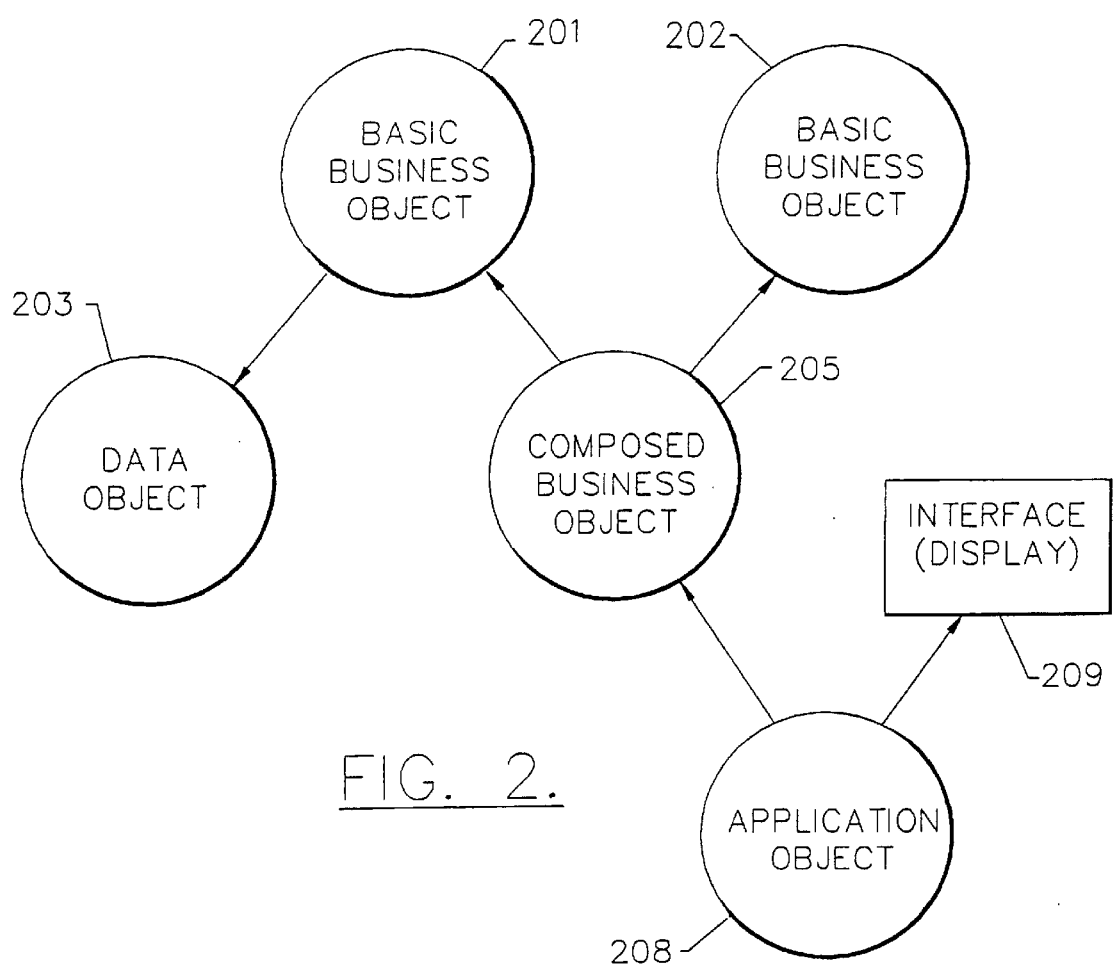
FIG. 2 illustrates the relationships between basic business objects, composed business objects, data objects and application objects according to the present invention.

Referring now to FIG. 2, the relationships of Basic Business Objects, Composed Business Objects, Data Objects and Application Objects will now be described. Basic Business Objects are illustrated in FIG. 2 at 201 and 202, respectively. Examples of Basic Business Objects include "person" and "policy." A Data Object is illustrated at 203. A data object which manages the persistence of the state data in a Business Object, includes attributes of the Business Object. An example of Data Object 203 is "person data object."

Composed Business Object 205 is composed or built from multiple Basic Business Objects. An example of a Composed Business Object is a "customer." Application Object 208 is related to Composed Business Object 205 and user interface 209. Application Object 208 implements the transient and persistent state of actively executing applications, in particular, those relating to Composed Business Object 205. Finally, the Application Object 208 communicates with user interface 209 to display the objects to the developer.

The framework building system according to the present invention assists the application developer in building Business Objects, Data Objects and Application Objects. The system supports both top down and bottom up development of application programs. In top down development, the developer defines Business Object classes that directly map to the business logic design or model. The Data Objects are derived from the state data of the Business Objects.

In bottom up development, the Business Object definition corresponds to the existing legacy schema. Examples of the existing legacy schema include the "relational" table and the CICS transaction. The "relational" table refers to a table in a relational database such as the DB2 database, which is marketed by IBM. The "CICS" transaction refers to a transaction program that runs on a CICS server. The Data Object for wrapping the application and the data is first defined. Thereafter, the Business Object definition is rendered from the Data Objects.

The framework building system according to the present invention assists the developer in generating the definition of the object model and implementation corresponding to the business logic design. Once the object model and implementation has been defined, the developer can generate the code and perform unit testing in a stand alone environment. Thereafter, the framework building system may be used to add necessary services, such as, for example, transaction and locking services, to enable the business objects to work in a distributed environment. The framework building system according to the present invention generates all necessary implementation bindings required in order to make the Business Object into a Business Object Server Solution (BOSS) managed object.

The above functions are implemented by the framework building system according to the present invention by the following subsystems, namely, a user interface or framework completion subsystem, a data model subsystem, a code generation subsystem, and a parsing and importing subsystem.

Figure 3:
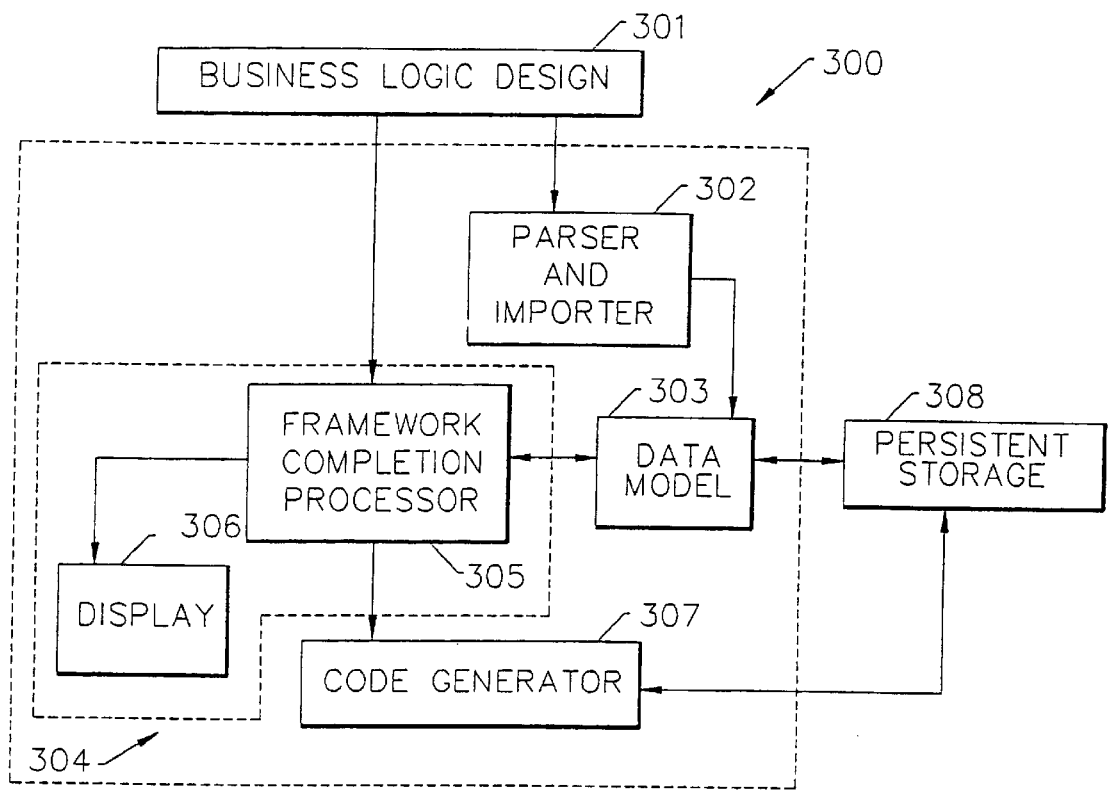
FIG. 3 is a schematic block diagram illustrating the framework builder according to the present invention.

Referring now to FIG. 3, the overall architecture of the framework building system 300 will now be described. The business logic design 301 which was developed by business personnel or programmers is provided to the framework builder 300. The parsing and importing subsystem 302 parses any previously generated code included in business logic design 301. The parsing and importing subsystem may parse an interface definition language (IDL) file. The parsed IDL file is then imported by the parsing and importing subsystem 302 into the data model 303.

Figure 1:
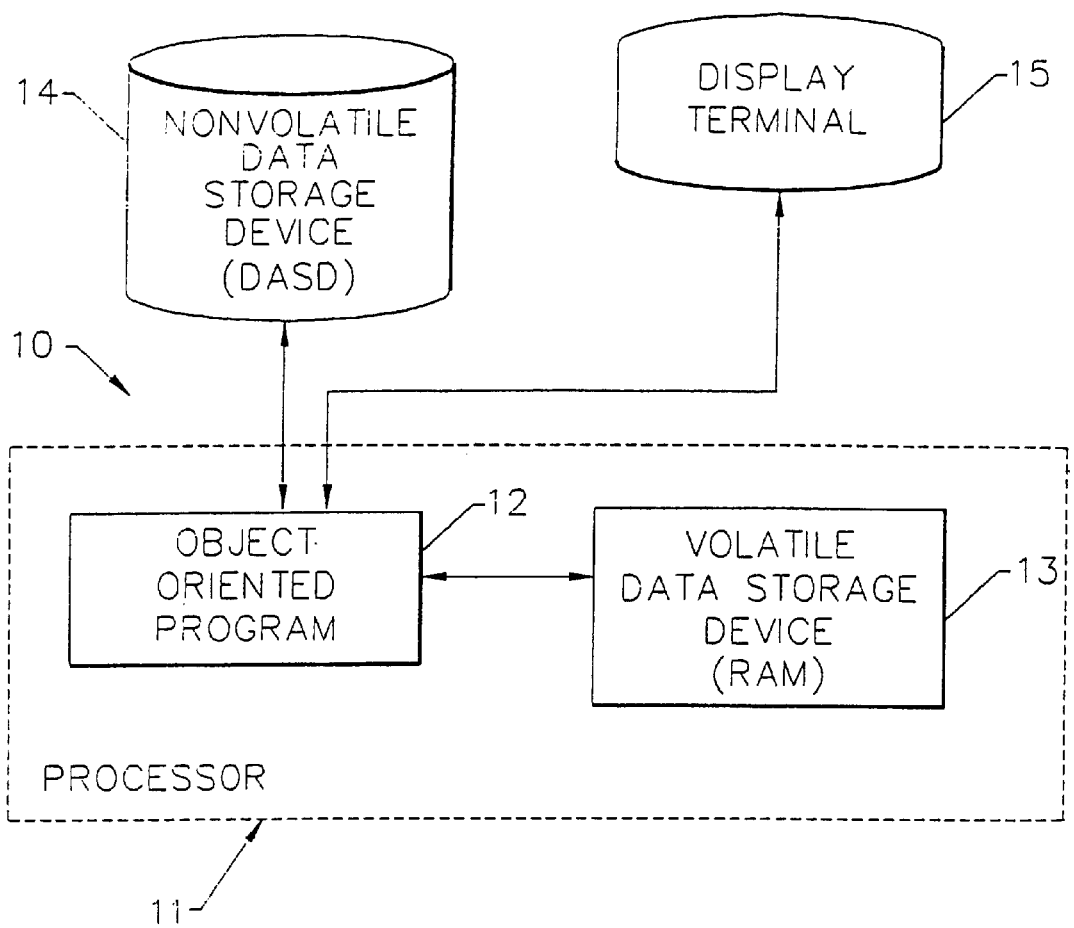
FIG. 1 illustrates a block diagram of an object oriented computing environment.

The business logic design 301 is also provided to the framework completion subsystem 304. The framework completion subsystem 304 comprises framework completion processor 305 and display 306. Display 306 corresponds to display terminal 15 illustrated in FIG. 1. Framework completion subsystem 304 provides the user interface to "walk" the developer through the framework completion process. The completed frameworks are then stored in data model 303. In addition, the completed frameworks are then translated into object oriented programming code by code generator 307. Finally, persistence storage 308 stores the code generated by code generator 307.

The design for the object oriented program, and in particular, the business logic design for the business related object oriented program, are often developed using visual modeling tools to first perform a business analysis and then to develop the business architecture and design. The purpose of conducting the business analysis is to identify and define the business requirements and functionality for the application program. For example, a business requirement or function may be a query for information relating to customers in an insurance environment, and the functions may include tracking customers and resolving customer claims. The next step in the development process may be to develop the architecture and design for the application program based upon the business requirements and functionality developed during the business analysis. The architecture and design breaks the business requirements and functionality down into modules or basic elements.

The developer starts with a high level design and refines the design into lower levels to include more detail. The designer will design objects and classes in an attempt to match real world objects to objects in the application program to be developed for use in an object oriented environment, and to introduce new classes that may not be part of the real world objects. The developer then expands the initial architecture and design to a more detailed architecture and design. Thereafter, the designer may identify relationships between the classes. As part of defining relationships between classes, the designer may also introduce inheritance into the relationships. The introduction of inheritance into the relationships enables the identification of commonality between classes. In addition, the developer may also introduce new classes, and may add attributes and method to the design.

Detailed Description: Framework Completion Subsystem (User Interface)

The detailed design of the framework completion subsystem 304 (user interface) illustrated in FIG. 3 will now be described. Framework completion subsystem will also be referred to as the "user interface." The user interface interactively generates the "interface" for the Business Objects corresponding to the business logic design. This is accomplished by displaying the various "interfaces" in various stages of completion, enacting various actions or "help guided actions" on the frameworks in various stages of completion, and implementing the Business Objects through language sensitive editing.

Figure 4:
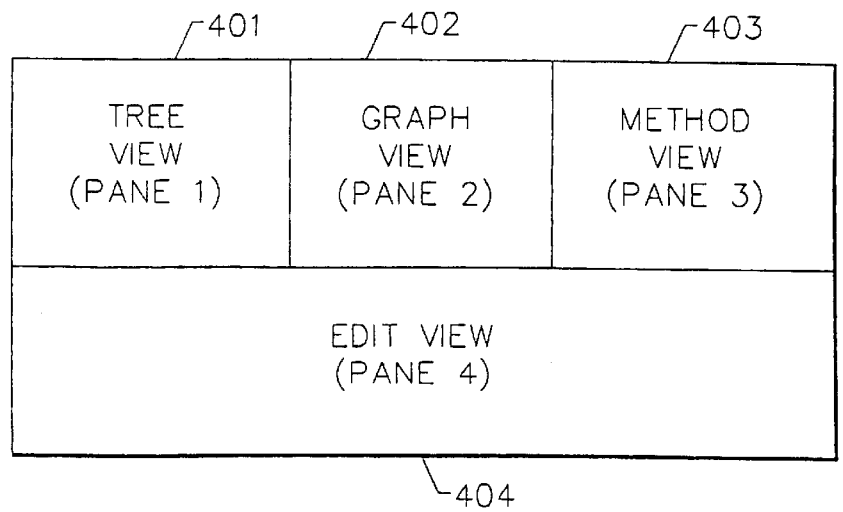
FIG. 4 is a schematic block diagram illustrating the components of the framework completion subsystem of the framework builder illustrated in FIG. 3 according to the present invention from a "window" perspective.
Figures 5, 6:
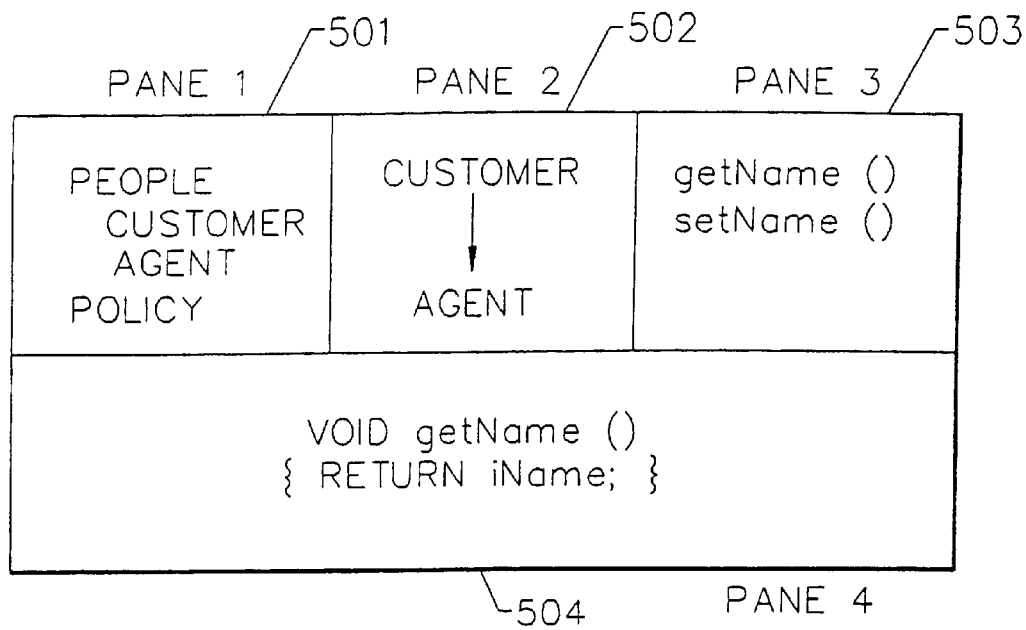
FIG. 5 is a schematic diagram illustrating the framework completion subsystem of FIG. 4 for an example illustrating the operations of the framework completion subsystem.
FIG. 6 is a structural diagram illustrating the tree view of the framework completion subsystem of FIG. 4 for an example relating to a "customer" object.

The user interface will be described with reference to the "window" illustrated in FIGS. 4 and 5. The window illustrated in FIGS. 4 and 5 is implemented in computer software using a preferred embodiment of the invention, and is displayed on display 306 (see FIG. 3). The user interface window illustrated in FIGS. 4 and 5 has four panes. "Tree view" 401, 501 is the first pane, "graph" view 402, 502 is the second pane, "method" view 403, 503 is the third pane, and "edit" view 404, 504 is the fourth pane.

Generally, the tree view 401, 501 displays a list of files in a "tree" view or format. Each file is represented by a node in the tree. A file node, for example, "people" as illustrated in FIG. 5 at 501, represents a file that is usable by an object oriented development system, preferably, an IDL file or a JAVA file. The tree in the first pane 401 may be expanded or contracted to represent one or more nodes. For example, an IDL file node can be expanded to nodes that represent modules and interfaces that are contained within the IDL file. As a further example, a JAVA file node can be expanded to nodes that represent interfaces that are contained within the JAVA file. As a further example, a JAVA file node can be expanded to nodes that represent interfaces that are contained within the JAVA file. In the example illustrated in FIG. 5, "customer" is an interface node contained within file node "people" in the first pane 501.

Each node may be associated with help guided actions that can be invoked to act upon that particular node. For example, if the node "people" is selected, the action "open" may be available by known methods, for example, an action bar, that will launch the corresponding builders that are associated with the node. As a result, the developer using the builder can enter metadata, for example, attribute names, attribute types, method names, parameters or constructive types. The tree view 401, 501 like all of the views or panes in the window illustrated in FIGS. 4 and 5, is scrollable by known methods in order to view and access information illustrated in the pane which is outside the display size of the pane on the screen.

In the preferred embodiment, there are three help guided actions which may be invoked on a node. The three help guided actions are "File Setup," "Module Setup," and "Interface Setup." The File Setup help guided action assists the developer in specifying file node information. The help guided action prompts the developer by asking questions. Different sets of questions are asked depending on whether the file node represents an IDL file or a JAVA file. For example, if the file is an IDL file, the framework building system will prompt the developer in tree view 401, 501 for a list of "include" files. On the other hand, if the file is a JAVA file, it will prompt the user to provide a list of "import" statements and the "package" name.

The Modular Setup help guided action is used for specifying IDL module information. The IDL module information includes identification of the constructs, including, for example, "typedefs," "structs," "unions," and "enums" that are to be included at the module level.

Finally, the Interface Setup help guided action is used for specifying interface information. Interface information may include a list of attributes, methods and parents. The framework building system will prompt the user for different information depending on whether the interface node represents an IDL interface or a JAVA interface. If the interface node represents an IDL interface, the framework building system will prompt the developer to list the constructs, including, for example, typedefs, structs, unions or enums, that are to be included in the interface node. On the other hand, if the interface node represents a JAVA interface, the framework building system will prompt the developer for an indication of the access restriction, such as, for example, default, public, protected or private, for the data members and methods.

Finally, a "generate" action may also be associated with each file node. Upon selection of the generate action by the developer, the framework building system generates all artifacts, for example, the IDL file, the implementation header file and the implementation file, that are associated with the object represented by the file node. In the preferred embodiment, the help guided actions and the other actions may be viewed by "clicking" the right button of the mouse on the particular node in the tree view 401 of FIG. 4.

As such, in the tree view 401, the framework building system converts the business logic design into an initial framework which is illustrated in a tree view. The developer may modify, including add or delete, files, interfaces, modules, attributes or methods. In addition, access patterns to the data from the Data Object may be defined, and the persistency of a Data Object may be defined and entered into a relationship with the Business Object.

Finally, with respect to the tree view example illustrated at 501 of FIG. 5, the framework building system according to the present invention assists the developer in, for example, adding the file "people" which contains the interface "customer," adding the interface "customer" to the file "people," adding attributes, such as, for example, "name," "age," or "address" to the interface "customer," and adding methods, such as, for example, "get policy" which is a user-defined method as opposed to a framework method, to the interface "policy."

Referring now to the graph view 402 in FIG. 4 and the example of the graph view 502 in FIG. 5, the second pane of the user interface will now be described. The graph view illustrates the graphical relationships for objects included in the tree view 401 and 501, including the inheritance relationships between the objects. A graph view is automatically refreshed when changes are made to the tree view in Pane 1 to show the new relationships between any objects in the tree view which resulted as of the changes to the tree view.

In the preferred embodiment, the graph view 402 and 502 support an inheritance view type. However, it will be understood by those skilled in the art that the graph view may be extended to support various other view types, including, for example, Business Object to Data Object mapping views.

In operation, if a developer selects a file or a module node in tree view 401 or 501, the framework building system displays all interfaces within the selected file or module node in the graph view 402 or 502. If the developer selects only an interface node in the tree view, the framework building system according to the present invention will only display the interface node in the graph view 402 or 502.

Still referring to FIGS. 4 and 5, the method view or Pane 3 will now be described. The method view 403 (see FIG. 4), an example of which is illustrated at 503 in FIG. 5, displays a list of the methods, and the "getter" and the "setter" for each attribute of the interface that was selected by the developer from the graph view. "Getter" refers to the "get" function associated with an attribute. "Setter" refers to the "set" function associated with an attribute. In addition, the framework building system generates the framework methods required to override and implement the framework due to subclassing of objects. The generated framework methods are displayed in the method view 403. In the example illustrated at 503 in FIG. 5, the framework methods "getName" and "setName" are displayed. Finally, the framework building system displays any method that the developer entered using the interface set up help guided action in the tree view 401, will be displayed in the method view 403.

Framework methods refer to a set of methods that are implemented for the application. An example of a framework method is "sync to Data Object" and "sync from Data Object." These framework methods may be needed, for example, due to the selection of a caching pattern. On the other hand, "user defined methods" are methods which are left to the developer to implement.

Still referring to FIGS. 4 and 5, the edit view or Pane 4 will now be described. The edit view, which is illustrated at 404 (see FIG. 4), is a language sensitive editing window that allows the developer to enter the method implementation for the method that was selected in the method view. For example, as illustrated at 504 of FIG. 5, the following method implementation:

```
void getName ( )
{Return iName;}
``` is displayed. This method implementation is displayed at 504 of FIG. 5 as a result of the selection of "getName ( )" in the method view 503 of FIG. 5. Since this method is a framework method, the code is displayed in the edit view. If this method was a user defined method, the developer would be required to write the code in the edit view.

Detailed Description: Data Model Subsystem

The user interface of the framework building system, including the help guided actions, the editor and the viewers, collect interface definition and implementation data and store the collected data in the framework building system's data model. As described briefly above, the parsing and importing subsystem parses the interface definition from source files or other forms of data source and imports the parsed interface definition into the framework building system's data model. Finally, a set of application programming interfaces (APIs) are provided for adding, updating, deleting and querying the framework building system's data model. A detailed description of the framework building system's data model is provided in the co-pending application entitled "Reusing Code In Object Oriented Program Development" filed on May 1, 1997 and assigned U.S. patent application Ser. No. 08/846,869, which is assigned to International Business Machines, Corporation (IBM), the assignee of the present invention. This application, which has an internal IBM docket number of CA9-97-011, is incorporated herein by reference.

Detailed Description: Code Generation Subsystem

The code generator 307 (see FIG. 3) will now be described. The code generator generates the necessary code to make the framework aware of all Business Objects. The code generator generates the methods required by the framework, including, for example, "externalized_to_ stream" and "internalized_from_stream" as well as the necessary "mixin" classes to convert the business object into a managed object. "Mixin" classes refers to the classes that are needed in order to make the infrastructure of the business object server function correctly. Finally, "managed object" refers to business objects that are installed on a server and are managed by the "runtime" operations.

The code generator of the framework building system generates the "overrides" for the framework methods using a preload function that preloads the data model 303 (see FIG. 3) with framework interfaces. "Overriding" occurs when a function which is a member of a subclass is given the same name as a function which is a member of a base class. When the member function is called in the subclass, it overrides the member function having the same name in the base class. As a result, the member function in the subclass is called instead of the member function having the same name in the base class.

Each method that must be implemented by the developer is tagged with an "override" flag. As a result, when the developer defines an interface that is a subclass from a framework interface, the method that must be implemented by the developer is automatically added to the method view 403 (see FIG. 4). In addition, all default implementations are also supplied at this time.

As previously indicated, the developer may develop the Business Object interface in IDL and implement the Business Object interface using the C++ programming language. In this instance, the framework building system generates the IDL file, the implementation template file using the CORBA 2.0 language bindings, the implementation bindings and the factories. CORBA, which refers to "Common Object Request Broker Architecture," was developed by Object Management Group (OMG). OMG is an organization which defines standards for object oriented programming. CORBA permits applications to communicate with each other regardless as to where they are located or the identification of the designer. In essence, CORBA defines interoperability by specifying the interoperability between object request brokers (ORB) from different vendors. A client that uses ORB, transparently invokes a method on a server object which resides either on the same or a different machine. The ORB intercepts the method invocation and finds an object that can implement the method, passes the parameters to the object, invokes the method of the object and returns the results to the requesting client. The client need not have any knowledge as to the location of the object, the programming language, the operating system or any other system aspects that are not part of the object's interface. As a result, the ORB provides interoperability between applications on different machines and heterogenous distributed environments and seamlessly interconnects multiple object systems. A detailed description of the design and operation of CORBA is provided by Object Management Group at its website located at "http://www.omg.org," the disclosure of which is incorporated herein by reference.

Similarly, the developer may develop the Business Objects in JAVA. If JAVA is used to develop the Business Objects, the framework building system generates the JAVA interface, the JAVA class that contains the implementation, and Implementation Bindings class and a Factory class. The Implementation Bindings class, which may be referred to as the "managed object," comprises code to add in the quality of services for the Business Object. Examples of quality of services include transaction, locking, naming, query and events. The developer selects the desired quality of service. In response to the selection of the desired quality of service, the code generation generates the appropriate methods from the OMG Object Services run-time into the Implementation Binding. "Factory" class refers to a class that is used to create objects. "OMG Object Services" refers to the set of object services such as "transaction security," "events," and "naming."

The code generation subsystem of the framework building system uses an extensible, template driven approach to code generation. The output format of the code generation is in the form of template files. The code generation subsystem places macros in the template files for values that are retrieved from the framework building system's data model 303 (see FIG. 3). An emitter navigates the data model, retrieves the values for the macro, and emits the final output.

Finally, the code generator generates an interface definition that can be successfully compiled. The code generator maintains schematic consistency in the data model, checking for correct input in the user interface and computing the necessary forward declarations immediately before code generation. By way of example, if a type is referenced in an attribute declaration and the type is deleted, the attribute is automatically deleted. On the other hand, if an interface is referenced before it is declared, the code generator automatically adds the forward declaration statement into the IDL file without specifically collecting the input from the developer.

Detailed Design: Parsing and Importing Subsystem

The framework building system also converts interface definitions that were written in interfaces used in conventional editors into Business Object corresponding classes. This is accomplished by the parsing and importing subsystem which generates the necessary artifacts for interface definitions written using a conventional editor. The necessary artifacts are generated by the parsing and importing subsystem by parsing the interface definition stored in the source files, for example, the ".idl" or ".JAVA" file or in some form of repository such as the CORBA interface repository. Once the interface definitions have been parsed, the parsing and importing subsystem then stores (i.e, imports) the parsed interfaced definitions into the framework building system's data model. This subsystem uses the same set of model application programming interfaces (APIs) as used by the user interface subsystem to populate the framework building system's data model.

Once the parsed interface definition has been imported into the data model, the same template based code generation scheme is used by the code generator to emit the necessary code to make the generated object correspond to the Business Object environment. The developer can also use the framework building system to continue extending the interface definitions, and regenerate the ".idl" or ".JAVA" files that contain the new interface definitions.

Detailed Design: User Interface Extension

In an alternative embodiment, the user interface subsystem of the present invention may be extended to enable the development of business objects that can run in a CORBA or JAVA environment by following a programming model which includes design patterns that are common to object oriented distributed applications. In particular, this programming model which is referred to as "BOSS" or "CB Series" is based on programming by framework completion which enables a server class to extend one of the base classes and inherit the implementation from the framework. In addition, new server objects are constructed by aggregating classes to define a new class that provides business functions.

The extended Business Object includes a client interface, an implementation interface, and implementation logic. In addition, the Business Object optionally may include a Data Object. If the Data Object is included, then the implementation logic for the data object is also included in the Business Object. Still further, the Business Object also comprises a set of key classes, a set of copy helper classes and a managed object interface and implementation. Finally, the Business Object optionally may include a specialized home.

Referring now to FIG. 6, an example of this extended Business Object will now be described. FIG. 6 illustrates an example of the extended Business Object in a tree view. In this tree view, "CUSTOMER" is an example of a client interface, "CUSTOMER BO" is an example of a Business Object. In addition, "CUSTOMER DO" and "CUSTOMER MO" are examples of Data Objects. Still further, "CUSTOMERUNITTESTDO" and "CUSTOMERRELATIONALDO" are examples of implementations of Data Objects. "CUSTOMERKEY1" and "CUSTOMERKEY2" are examples of key classes, and "CUSTOMERCOPY1" and "CUSTOMERCOPY2" are examples of copy helper classes. Finally, "CUSTOMERHOME" is an example of a specialized home. A specialized home refers to a customization of the standard "Home" interface.

Detailed Design: Additional Help Guided Actions

The extended Business Object has a number of additional help guided actions associated with it. The help guided actions, similar to the File Setup help guided action, Module Setup help guided action and Interface Setup help guided action, are invoked from the nodes in the tree view and act upon the nodes in the tree view. These additional help guided actions include a Business Object Implementation help guided action, a Data Object Implementation help guided action, a Managed Object Implementation help guided action, a Key Implementation help guided action, a Copy Helper Implementation help guided action and a Home Implementation help guided action.

The Business Object Implementation help guided action assists the developer in interactively determining the type of the Business Object and determining the data access pattern for the Business Object. For example, the object type may be a Basic Business Object, a Composite Business Object, a Data Object or an Application Object. In addition, the data access pattern may be "caching," "delegating" or "none."

The Business Object Implementation help guided action generates the framework methods and corresponding default implementations to obtain business object implementation classes based on the selection of the object types and the data access pattern. It will be understood by those having skill in the art that the Business Object can have multiple business object implementations. In addition, each business object implementation may use a different data access pattern.

The Data Object Implementation help guided action assists the developer in determining the type of "back end" storage to use for the persistent data of the business object. The framework building system, and in particular, the user interface subsystem, generates the appropriate data object implementation in response to the type of "back end" storage selected by the developer.

The Managed Object Implementation help guided action assists the developer in identifying the "instance manager" to manage the business objects. "Instance manager" refers to the "run-time" function that is responsible for managing the managed object instances. In response to the developer's selection of a particular "instance manager," the user interface subsystem adds "mixin" calls to the managed object implementation for delegating to the corresponding set of services.

The Key Implementation help guided action assists the developer in identifying the attributes to be designated as either a primary key or a secondary key for creating or locating the business object. The user interface subsystem generates the key implementation class using the appropriate framework methods and their default implementations based on the selection of particular attributes as primary or secondary keys.

The Copy Helper Implementation help guided action assists the developer in identifying the particular attributes to be included in the copy helper class in order to provide efficient object creation. The user interface subsystem generates the copy helper implementation class from the selected attributes and the corresponding framework methods.

The Home Implementation help guided action assists the developer in writing his own specialized home for the business object. This help guided action may be used by the developer if the developer believes that the default home implementation is insufficient.

Detailed Design: Additional Classes

The metadata collected by the help guided actions using the user interface subsystem according to the present invention is stored in the data model 303 (see FIG. 3) and is used by code generator 307 (see FIG. 3) for generating the code that represents each node in the tree view. In an alternative embodiment, the interface type may be extended to include a number of additional relationships or classes for modeling. These additional classes or relationships include OBBoImplClass, OBDoClass, OBDoImplClass, OBMoClass, OBKeyClass, OBCopyHelperClass, and OBHomeClass.

The OBBoImplClass is a one (1) to many relationship between a client interface and its business object implementation. For example, referring to FIG. 6, the client interface "CUSTOMER" has a one (1) to many relationship with its business object implementation, for example, "CUSTOMERBO." The OBDoClass is a one (1) to one (1) relationship between a business object implementation and its data object interface. For example, as illustrated in FIG. 6, a business object implementation is "CUSTOMERBO" and a data object interface is "CUSTOMERDO."

The OBDoImplClass is a one (1) to many relationship between a data object interface and a data object implementation. Referring again to FIG. 6, "CUSTOMERDO" is an example of a data object interface and "CUSTOMERUNIT-TESTDO" and "CUSTOMERRELATIONALDO" are examples of the data object implementations. The OBMoClass provides a one (1) to many relationship between a business object implementation and its managed object implementation. Referring again to FIG. 6, an example of a business object implementation is "CUSTOMERBO" while an example of a managed object implementation is "CUSTOMERMO."

The OBKeyClass is a one (1) to many relationship between a client interface and its key. As illustrated in FIG. 6, an example of a client interface is "CUSTOMER" while an example of its corresponding key is "CUSTOMERKEY1." Similarly, the OBCopyHelperClass is also a one (1) to many relationship. This relationship is between a client interface and its copy helper. As illustrated in FIG. 6, "CUSTOMER" is an example of the client interface while "CUSTOMERCOPY1" is an example of its related copy helper. Finally, the OBHomeClass also is a one (1) to many relationship. This relationship is between the client interface and its specialized home. Referring to FIG. 6, "CUSTOMER" is an example of a client interface while an example of its related specialized home is "CUSTOMERHOME."

CB Series Container

The framework building system according to the present invention also assists developers in defining container types that have different quality of services. Containers are run time objects that are set up on servers. At development time, the developer may define new container types using a container configuration help guided action. The container configuration help guided action enables the developer to specify different memory management, transaction, termination and caching policies for the container they are defining. The metadata that results from the location of the container configuration help guided action is stored in the OBBossContainer model type. This container information is used when the developer defines a business application.

Defining A Business Application

A business application consists of multiple managed objects, their related keys, related copy helpers and related home classes as well as the container selected by the developer. The framework building system installs the objects on a target system (i.e., the server). As input, the present invention requires a system management Data Definition Language (DDL) file that captures information about the application. The framework building system generates this DDL file using an Application Configuration help guided action. This help guided action, once invoked, enables the user to select the set of managed objects and a container in the necessary home. In addition, this help guided action validates the combination of managed objects, the container, and the necessary homes, and generates a DDL file that can be used to drive the system management tool.

In the drawings and specification, there have been disclosed typically preferred embodiments of the preferred invention and, although specific terms are employed, they are used in a generic and descriptive sense only and not for purpose of limitation, the scope of the invention being set forth in the following claims.

That which is claimed is:

1. A system for building a framework of objects corresponding to a design for an object oriented application, said system comprising:

means for generating an initial framework corresponding to the design, said initial framework corresponding to at least one of file objects, module objects, interface objects, methods and attributes;

means for displaying the generated initial framework;

means for accepting changes to a first part of the initial framework; and means for implementing the accepted changes to the first part of the initial framework to obtain a completed framework;

wherein said generating means further comprises:

means for displaying options for types of run-time objects and for selecting selection of at least one of said options for types of run-time objects to be included in the completed framework;

means for generating run-time objects from said selected options and a business logic design; and means for storing the run-time objects.

2. The system according to claim 1, wherein said means for generating an initial framework comprises:

means for differentiating between user methods and framework methods in the initial framework; and means for identifying the first part of the initial framework as requiring completion, a second part of the initial framework as completed, and a third part of the initial framework which may be completed.

3. The system according to claim 2, wherein said displaying means comprises means, responsive to said identifying means, for displaying the first part of the initial framework and the third part of the initial framework without displaying the second part of the initial framework.

4. The system according to claim 1, wherein said displaying means comprises:

means for displaying a tree view of the generated initial framework, said tree view comprising at least one file object;

means for displaying a graph view of the objects in the generated initial framework, said graph view representing relationships between objects in the generated initial framework;

means for displaying a method view of the methods corresponding to the objects in the generated initial framework; and means for displaying changes to the first part of the initial framework accepted by the accepting means.

5. The system according to claim 4, wherein said tree view comprises:

the initial framework; and a plurality of actions for modifying the at least one file object in said initial framework.

6. The system according to claim 1 further comprising means for storing said completed framework.

7. The system according to claim 6 further comprising means for generating computer program code from the completed framework, said generated computer program code capable of being executed in a distributed computing environment.

8. The system according to claim 7 further comprising:

means for parsing interface definitions prior to interactive generation of the initial framework; and means for importing said parsed interface definitions into said storing means.

9. The system according to claim 1, wherein said design is a business logic design.

10. The system according to claim 1, wherein said objects comprise at least one of a business object, a data object and an application object.

11. The system according to claim 1, wherein said design is a business logic design; and wherein said means for generating an initial framework comprises:

means for accepting an initial business logic design;

means, responsive to said initial business logic design generating means, for generating a business logic design corresponding to said initial business logic design; and means, responsive to said business logic design generating means, for importing said business logic design to said initial framework generating means.

12. The system according to claim 1, wherein said means for generating an initial framework comprises:

means for displaying options for components of said initial framework and for accepting selection of said options to be included in the generated initial framework;

means for generating the initial framework from said selected options and the business logic design; and means for storing the generated initial framework.

13. The system according to claim 1, wherein said completed framework is executed in a distributed computing enviroment.

14. A system for building a framework of objects corresponding to a design for an object oriented application, said system comprising:

means for generating an initial framework corresponding to the design, said initial framework comprising at least one of file objects, module objects, interface objects, methods and attributes;

means for displaying the generated initial framework;

means for accepting changes to a first part of the initial framework;

means for implementing the accepted changes to the first part of the initial framework to obtain a completed framework; and wherein said displaying and accepting means comprises:

means for displaying options corresponding to a plurality of object types and for accepting selection of at least one of said displayed object type options;

means for displaying options corresponding to a plurality of types of storage means for storing persistent data corresponding to the initial framework and for accepting selection of one of said plurality of types of storage means for storing persistent data;

means for displaying options corresponding to instance management of the initial framework and for accepting selection of one of said options corresponding to instance management;

means for displaying attributes corresponding to the initial framework and for accepting selection of one of said attributes as a primary key and one of said attributes as a secondary key;

means for displaying the attributes corresponding to the initial framework and for accepting selection of at least one of said attributes for inclusion in a copy helper class; and means for displaying options corresponding to home and for accepting selection of at least one of said options corresponding to home.

15. The system according to claim 14, wherein said generating means comprises:

means for differentiating between user methods and framework methods in the initial framework; and means for identifying the first part of the initial framework as requiring completion, a second part of the initial framework as completed, and a third part of the initial framework which may be completed.

16. The system according to claim 15, wherein said means for displaying the generated initial framework comprises means, responsive to said Identifying means, for displaying the first part of the initial framework and the third part of the initial framework without displaying the second part of the initial framework.

17. The system according to claim 14, wherein said means for displaying the generated initial framework comprises:

means for displaying a tree view of the generated initial framework, said tree view comprising at least one file object;

means for displaying a graph view of the objects in the generated initial framework, said graph view representing relationships between objects in the generated initial framework;

means for displaying a method view of the methods corresponding to the objects in the generated initial framework; and means for displaying changes to the first part of the initial framework accepted by the accepting means.

18. The system according to claim 17, wherein said tree view comprises:

the initial framework; and a plurality of actions for modifying the at least one file object in said initial framework.

19. The system according to claim 14 further comprising means for storing said completed framework.

20. The system according to claim 19 further comprising means for generating computer program code from the completed framework, said generated computer program code capable of being executed in a distributed computing environment.

21. The system according to claim 20 further comprising:

means for parsing interface definitions prior to interactive generation of the initial framework; and means for importing said parsed interface definitions into said storing means.

22. The system according to claim 14, wherein said design is a business logic design.

23. The system according to claim 14, wherein said objects comprise at least one of a business object, a data object and an application object.

24. The system according to claim 23, wherein said design is a business logic design; and wherein said generating means comprises:

means for accepting an initial business logic design;

means, responsive to said initial business logic design generating means, for generating a business logic design corresponding to said initial business logic design; and means, responsive to said business logic design generating means, for importing said business logic design to said initial framework generating means.

25. The system according to claim 14, wherein said generating means comprises:

means for displaying options for components of said initial framework and for accepting selection of said options to be included in the generated initial framework;

means for generating the initial framework from said selected options and the business logic design; and means for storing the generated initial framework.

26. The system according to claim 14, wherein said completed framework is executed in a distributed computing environment.

27. A method for building a framework of objects corresponding to a design for an object oriented application, said method comprising:

generating an initial framework corresponding to the design, said initial framework corresponding to at least one of file objects, module objects, interface objects, methods and attributes;

displaying the generated initial framework;

accepting changes to a first part of the initial framework;

implementing the accepted changes to the first part of the initial framework to obtain a completed framework; and wherein said generating step further comprises:

displaying options for types of run-time objects and for selecting selection of at least one of said options for types of run-time objects to be included in the completed framework;

generating run-time objects from said selected options and a business logic design; and storing the run-time objects.

28. The method according to claim 27, wherein said generating step comprises:

differentiating between user methods and framework methods in the initial framework; and identifying the first part of the initial framework as requiring completion, a second part of the initial framework as completed, and a third part of the initial framework which may be completed.

29. The method according to claim 28, wherein said step of displaying the generated initial framework comprises displaying the first part of the initial framework and the third part of the initial framework without displaying the second part of the initial framework.

30. The method according to claim 27, wherein said displaying step comprises:

displaying a tree view of the generated initial framework, said tree view comprising at least one file object;

displaying a graph view of the objects in the generated initial framework, said graph view representing relationships between objects in the generated initial framework;

displaying a method view of the methods corresponding to the objects in the generated initial framework; and displaying changes to the first part of the initial framework accepted by the accepting step.

31. The method according to claim 30, wherein said tree view comprises:

the initial framework; and a plurality of actions for modifying the at least one file object in said initial framework.

32. The method according to claim 27 further comprising storing said completed framework.

33. The method according to claim 32 further comprising generating computer program code from the completed framework, said generated computer program code capable of being executed in a distributed computing environment.

34. The method according to claim 33 further comprising:

parsing interface definitions prior to interactive generation of the initial framework; and importing said parsed interface definitions into said storing step.

35. The method according to claim 27, wherein said design is a business logic design.

36. The method according to claim 27, wherein said objects comprise at least one of a business object, a data object and an application object.

37. The method according to claim 27, wherein said design is a business logic design; and wherein said generating step comprises:

accepting an initial business logic design;

generating a business logic design corresponding to said initial business logic design; and importing said business logic design to said initial framework generating step.

38. The method according to claim 27, wherein said step of generating an initial framework comprises:

displaying options for components of said initial framework and accepting selection of said options to be included in the generated initial framework;

generating the initial framework from said selected options and the business logic design; and storing the generated initial framework.

39. The method according to claim 27, wherein said displaying and accepting steps comprise:

displaying options corresponding to a plurality of object types and accepting selection of at least one of said displayed object type options;

displaying options corresponding to a plurality of types of storage for storing persistent data corresponding to the initial framework and accepting selection of one of said plurality of types of storage for storing persistent data;

displaying options corresponding to instance management of the initial framework and accepting selection of one of said options corresponding to instance management;

displaying attributes corresponding to the initial framework and accepting selection of one of said attributes as a primary key and one of said attributes as a secondary key;

displaying the attributes corresponding to the initial framework and accepting selection of at least one of said attributes for inclusion in a copy helper class; and displaying options corresponding to home and accepting selection of at least one of said options corresponding to home.

40. The method according to claim 27, wherein said completed framework is executed in a distributed computing environment.

41. A method for building a framework of objects corresponding to a design for an object oriented application, said method comprising:

generating an initial framework corresponding to the design, said initial framework comprising at least one of file objects, module objects, interface objects, methods and attributes;

displaying the generated initial framework;

accepting changes to a first part of the initial framework; and implementing the accepted changes to the first part of the initial framework to obtain a completed framework; and wherein said displaying and accepting steps comprise:

displaying options corresponding to a plurality of object types and accepting selection of at least one of said displayed object type options;

displaying options corresponding to a plurality of types of storage for storing persistent data corresponding to the initial framework and accepting selection of one of said plurality of types of storage for storing persistent data;

displaying options corresponding to instance management of the initial framework and accepting selection of one of said options corresponding to instance management;

displaying attributes corresponding to the initial framework and accepting selection of one of said attributes as a primary key and one of said attributes as a secondary key;

displaying the attributes corresponding to the initial framework and accepting selection of at least one of said attributes for inclusion in a copy helper class; and displaying options corresponding to home and accepting selection of at least one of said options corresponding to home.

42. The method according to claim 41, wherein said step of generating an initial framework comprises:

differentiating between user methods and framework methods in the initial framework; and identifying the first part of the initial framework as requiring completion, a second part of the initial framework as completed, and a third part of the initial framework which may be completed.

43. The method according to claim 42, wherein said step of displaying an initial framework comprises displaying the first part of the initial framework and the third part of the initial framework without displaying the second part of the initial framework.

44. The method according to claim 41, wherein said step of displaying the generated initial framework comprises:

displaying a tree view of the generated initial framework, said tree view comprising at least one file object;

displaying a graph view of the objects in the generated initial framework, said graph view representing relationships between objects in the generated initial framework;

displaying a method view of the methods corresponding to the objects in the generated initial framework; and displaying changes to the first part of the initial framework accepted by the accepting step.

45. The method according to claim 44, wherein said tree view comprises:

the initial framework; and a plurality of actions for modifying the at least one file object in said initial framework.

46. The method according to claim 42 further comprising storing said completed framework.

47. The method according to claim 46 further comprising generating computer program code from the completed framework, said generated computer program code capable of being executed in a distributed computing environment.

48. The method according to claim 47 further comprising:

parsing interface definitions prior to interactive generation of the initial framework; and importing said parsed interface definitions into said storing step.

49. The method according to claim 41, wherein said design is a business logic design.

50. The method according to claim 41, wherein said objects comprise at least one of a business object, a data object and an application object.

51. The method according to claim 50, wherein said design is a business logic design; and wherein said generating step comprises:

accepting an initial business logic design;

generating a business logic design corresponding to said initial business logic design; and importing said business logic design to said initial framework generating step.

52. The method according to claim 41, wherein said generating step comprises:

displaying options for components of said initial framework and accepting selection of said options to be included in the generated initial framework;

generating the initial framework from said selected options and the business logic design; and storing the generated initial framework.

53. The method according to claim 41, wherein said completed framework is executed in a distributed computing environment.

54. A computer program product for building a framework of objects corresponding to a design for an object oriented application, said computer program product comprising:

a computer readable storage medium having computer readable code means embodied in said medium, said computer readable code means comprising:

computer instruction means for generating an initial framework corresponding to the design, said initial framework corresponding to at least one of file objects, module objects, interface objects, methods and attributes;

computer instructions means for displaying the generated initial framework;

computer instruction means for accepting changes to a first part of the initial framework;

computer instruction means for implementing the accepted changes to the first part of the initial framework to obtain a completed framework;

wherein said generating means further comprises:

computer instruction means for displaying options for types of run-time objects and for selecting selection of at least one of said options for types of run-time objects to be included in the completed framework;

computer instruction means for generating run-time objects from said selected options and a business logic design; and computer instruction means for storing the run-time objects.

55. The computer program product according to claim 54, wherein said computer instruction means for generating an initial framework comprises:

computer instruction means for differentiating between user methods and framework methods in the initial framework; and computer instruction means for identifying the first part of the initial framework as requiring completion, a second part of the initial framework as completed, and a third part of the initial framework which may be completed.

56. The computer program product according to claim 55, wherein said computer instruction means for displaying the generated initial framework comprises computer instruction means for displaying the first part of the initial framework and the third part of the initial framework without displaying the second part of the initial framework.

57. The computer program product according to claim 54, wherein said computer instruction means for displaying the generated initial framework comprises:

computer instruction means for displaying a tree view of the generated initial framework, said tree view comprising at least one file object;

computer instruction means for displaying a graph view of the objects in the generated initial framework, said graph view representing relationships between objects in the generated initial framework;

computer instruction means for displaying a method view of the methods corresponding to the objects in the generated initial framework; and computer instruction means for displaying changes to the first part of the initial framework accepted by the accepting means.

58. The computer program product according to claim 57, wherein said tree view comprises:

the initial framework; and a plurality of actions for modifying the at least one file object in said initial framework.

59. The computer program product according to claim 54 further comprising computer instruction means for generating computer program code from the completed framework, said generated computer program code being capable of being executed in a distributed computing environment.

60. The computer program product according to claim 59 further comprising:

computer instruction means for parsing Interface definitions prior to interactive generation of the initial framework; and computer instruction means for importing said parsed interface definitions.

61. The computer program product according to claim 54, wherein said design is a business logic design.

62. The computer program product according to claim 54, wherein said objects comprise at least one of a business object, a data object and an application object.

63. The computer program product according to claim 54, wherein said design is a business logic design; and wherein said computer instruction means for generating an initial framework comprises:

computer instruction means for accepting an initial business logic design;

computer instruction means for generating a business logic design corresponding to said initial business logic design; and computer instruction means for importing said business logic design to said computer instruction means for generating an initial framework.

64. The system according to claim 54, wherein said computer instruction means for generating an initial framework comprises:

computer instruction means for displaying options for components of said initial framework and accepting selection of said options to be included in the generated initial framework;

computer instruction means for generating the initial framework from said selected options and the business logic design; and computer instruction means for storing the generated initial framework.

65. The computer program product according to claim 54, wherein said displaying and accepting means comprise:

computer instruction means for displaying options corresponding to a plurality of object types and accepting selection of at least one of said displayed object type options;

computer instruction means for displaying options corresponding to a plurality of types of storage for storing persistent data corresponding to the initial framework and accepting selection of one of said plurality of types of storage for storing persistent data;

computer instruction means for displaying options corresponding to instance management of the initial framework and accepting selection of one of said options corresponding to instance management;

computer instruction means for displaying attributes corresponding to the initial framework and accepting selection of one of said attributes as a primary key and one of said attributes as a secondary key;

computer instruction means for displaying the attributes corresponding to the initial framework and accepting selection of at least one of said attributes for inclusion in a copy helper class; and computer instruction means for displaying options corresponding to home and accepting selection of at least one of said options corresponding to home.

66. A computer program product for building a framework of objects corresponding to a design for an object oriented application, said computer program product comprising:

a computer readable storage medium having computer readable code means embodied in said medium, said computer readable code means comprising:

computer instruction means for generating an initial framework corresponding to the design, said initial framework comprising at least one of file objects, module objects, interface objects, methods and attributes;

computer instruction means for displaying the generated initial framework;

computer instruction means for accepting changes to a first part of the initial framework; and computer instruction means for implementing the accepted changes to the first part of the initial framework to obtain a completed framework; and wherein said displaying and accepting means comprise:

computer instruction means for displaying options corresponding to a plurality of object types and accepting selection of at least one of said displayed object type options;

computer instruction means for displaying options corresponding to a plurality of types of storage for storing persistent data corresponding to the initial framework and accepting selection of one of said plurality of types of storage for storing persistent data;

computer instruction means for displaying options corresponding to instance management of the initial framework and accepting selection of one of said options corresponding to instance management;

computer instruction means for means for displaying attributes corresponding to the initial framework and accepting selection of one of said attributes as a primary key and one of said attributes as a secondary key;

computer instruction means for means for displaying the attributes corresponding to the initial framework and accepting selection of at least one of said attributes for inclusion in a copy helper class; and computer instruction means for means for displaying options corresponding to home and accepting selection of at least one of said options corresponding to home.

67. The computer program product according to claim 66, wherein said generating means comprises:

computer instruction means for differentiating between user methods and framework methods in the initial framework; and computer instruction means for identifying the first part of the initial framework as requiring completion, a second part of the initial framework as completed, and a third part of the initial framework which may be completed.

68. The computer program product according to claim 67, wherein said computer instruction means for displaying the generated initial framework comprises computer instruction means for displaying the first part of the initial framework and the third part of the initial framework without displaying the second part of the initial framework.

69. The computer program product according to claim 66, wherein said computer instruction means for displaying the generated initial framework comprises:

computer instruction means for displaying a tree view of the generated initial framework, said tree view comprising at least one file object;

computer instruction means for displaying a graph view of the objects in the generated initial framework, said graph view representing relationships between objects in the generated initial framework;

computer instruction means for displaying a method view of the methods corresponding to the objects in the generated initial framework; and computer instruction means for displaying changes to the first part of the initial framework accepted by the accepting computer instruction means.

70. The computer program product according to claim 69, wherein said tree view comprises:

the initial framework; and a plurality of actions for modifying the at least one file object in said initial framework.

71. The computer program product according to claim 66 further comprising computer instruction means for generating computer program code from the completed framework, said generated computer program code capable of being executed in a distributed computing environment.

72. The computer program product according to claim 71 further comprising:

computer instruction means for parsing interface definitions prior to interactive generation of the initial framework; and computer instruction means for importing said parsed interface definitions.

73. The computer program product according to claim 66, wherein said design is a business logic design.

74. The computer program product according to claim 66, wherein said objects comprise at least one of a business object, a data object and an application object.

75. The computer program product according to claim 74, wherein said design is a business logic design; and wherein said generating means comprises:

computer instruction means for accepting an initial business logic design;

computer instruction means for generating a business logic design corresponding to said initial business logic design; and computer instruction means for importing said business logic design to said initial framework generating means.

76. The computer program product according to claim 66, wherein said generating means comprises:

computer instruction means for displaying options for components of said initial framework and accepting selection of said options to be included in the generated initial framework;

computer instruction means for generating the initial framework from said selected options and the business logic design; and computer instruction means for storing the generated initial framework.

\* \* \* \* \*

UNITED STATES PATENT AND TRADEMARK OFFICE
CERTIFICATE OF CORRECTION

PATENT NO.    :    5,987,247
DATED         :    November 16, 1999
INVENTOR(S)   :    Christina Lau It is certified that error appears in the above-identified patent and that said Letters Patent is hereby corrected as shown below:

Column 6, line 56 should read as follows:
-- objects to be included in the completed framework as well --

Claim 13, line 3 should read as follows:
-- environment. --

Claim 16, line 3 should read as follows:
-- means, responsive to said identifying means, for displaying --

Claim 46, line 1 should read as follows:
-- 46. The method according to claim 41 further comprising --

Claim 60, line 3 should read as follows:
-- computer instruction means for parsing interface defini- --

Signed and Sealed this

Fifteenth Day of May, 2001

Attest:

NICHOLAS P. GODICI

*Attesting Officer*    *Acting Director of the United States Patent and Trademark Office*